United States Patent [19]

Bocker

[11] 3,798,561

[45] Mar. 19, 1974

[54] METHOD AND APPARATUS FOR DEMODULATION OF PHASE DIFFERENCE MODULATED DATA SIGNALS

[76] Inventor: Peter Bocker, Vinzenz-Schupfer-Str. 38, 8 Munich, Germany

[22] Filed: Sept. 24, 1971

[21] Appl. No.: 183,570

[30] Foreign Application Priority Data

Sept. 24, 1970 Germany ............................ 2047183

[52] U.S. Cl. .................... 329/104, 178/88, 325/320, 328/109, 328/134, 329/50

[51] Int. Cl. ............................................ H03d 3/18

[58] Field of Search ............ 329/50, 104, 137, 138; 328/109, 110, 134; 325/320; 78/66, 67, 88

[56] References Cited

UNITED STATES PATENTS

| | | | |
|---|---|---|---|
| 3,294,907 | 12/1966 | Heald | 325/320 X |
| 3,417,333 | 12/1968 | Atzenbeck | 325/320 |
| 3,418,585 | 12/1968 | Harnett | 328/134 |
| 3,472,960 | 10/1969 | Gutleber et al. | 178/67 |

*Primary Examiner*—Alfred L. Brody

[57] ABSTRACT

A method and apparatus are described for demodulating phase difference modulated signals wherein a carrier is modulated by specific, different valued phase shifts corresponding to the various levels of the data signal. Mean value-coherent demodulation is used wherein the transmitted predetermined interval and the phase resulting from the phases received up to that time as the mean value for the preceding predetermined interval. A reference frequency is generated which includes all the possible phase values for the data. A pulse is triggered by a crossover of the carrier signal during the predetermined interval. At the time of the latter crossover, the phase of the received signal is compared with the mean value of phase values received during preceding predetermined intervals. A decoder is provided which, according to the coding used, forms the transmitted data signal from the aforementioned difference information.

5 Claims, 3 Drawing Figures

METHOD AND APPARATUS FOR DEMODULATION OF PHASE DIFFERENCE MODULATED DATA SIGNALS

BACKGROUND OF THE INVENTION

This invention relates to a method and circuitry for demodulating phase difference modulated data signals, wherein binary coded data are transmitted by specific, different valued phase shifts which follow each other in the fixed time interval of a modulation segment and which are associated with the step combinations of the data to be transmitted occurring in the modulation segment.

Phase difference modulation is a known technique for data transmission. In phase difference modulation the data to be transmitted are designated, not by the phase position of the carrier frequency oscillation, but by the change of the phase position. For example, with binary modulation "zeros" may be designated by a phase change, while "ones " may be designated by no phase change. Of course, the converse arrangement may be used. With 4-valued modulation two binary steps are expressed by a modulation step, and for example, a phase shift of +90° denotes the step pair (dibit) "01", a phase shift of −90° denotes the step pair (dibit) "10", a phase shift of 180° denotes the step pair (dibit) "11" and no phase shift denotes the step pair (dibit) "00."

Demodulation on the receiving end proceeds with aid of a signal generator which generates a frequency corresponding with the unmodulated carrier oscillation and is synchronized to the received carrier frequency. The phase shift is determined by a comparison, and the correspondingly established step combination is transmitted as received data.

A circuit arrangement is known for a digital demodulator which operates according to the differential-coherent demodulation principle. In this principle the data are determined from the difference between the carrier oscillation phases in two successive modulation segments. The circuit has a reference oscillator which emits as many phases of the reference frequency as there are phase states established for the transmission. A signal generator delivers a scanning impulse midway between two phase shifts. In this moment the phase of the reference frequency should concide with the phase of the carrier frequency. In case of a deviation the phase of the reference frequency is corrected to the phase of the carrier frequency before the scanning moment. The first crossover of the carrier frequency during the duration of the scanning impulse is fed in binary coded form into a first store as reference phase. Shortly before the next scanning moment in the following modulation segment, the contents of the first store are fed into a second store. The phase value resulting from the next scanning is again fed into the first store. The associated combination of message steps arises in a decoder from the difference between the contents of the stores, according to the coding.

The principle of differential-coherent modulation has the disadvantage that the phase of the reference frequency is synchronized temporarily with the phase of the carrier frequency before the scanning moment. Such a demodulator is subject to interference through this association with the carrier frequency, since temporarily superimposed interferences spuriously trigger the reference frequency.

An object of the invention is to provide a method and apparatus for the demodulation of phase difference modulated data signals which has a small susceptibility to interference.

SUMMARY OF THE INVENTION

The aforementioned and other objects are obtained by generating a reference frequency at the receiver, which reference frequency forms the possible phase values used in transmitting the data in binary coded form. A pulse is initiated in the middle of a modulation segment by the crossover of the carrier oscillation, which determines the scanning moment. At the moment of scanning, the phase of the carrier oscillation received within the modulation segment is compared with the mean value of the phase values received in the preceeding modulation segments. From the difference between the phase values, the step combinations associated in accordance with the coding are reformed in a decoder.

A concept underlying the invention is that the transmitted data are reclaimed from the difference between the phase received within a modulation segment and the phase which was taken from the phases received up to that time as mean value for the preceeding modulation segment (mean value-coherent demodulation). An advantage of mean value-coherent demodulation is that a smaller interference interval is necessary for a certain mean frequency of step errors than with differential-coherent demodulation. This advantage is particularly noticeable with a n-valued phase difference modulation with a larger number $n$ of possible phase values. With the mean value-coherent demodulator the reference potential of the reference oscillator is corrected with aid of a phase synchronization circuit by an amount corresponding to the mean value of the phases of the carrier oscillation previously received. The new demodulation procedure enables construction with digital elements using integrated circuit technology. The proposed demodulator can be simply adjusted to the new demodulation process.

BRIEF DESCRIPTION OF THE DRAWING

The principles of the invention will be best understood by reference to a detailed description of a preferred form for its execution given hereinbelow in conjunction with the drawings.

Figure 1:
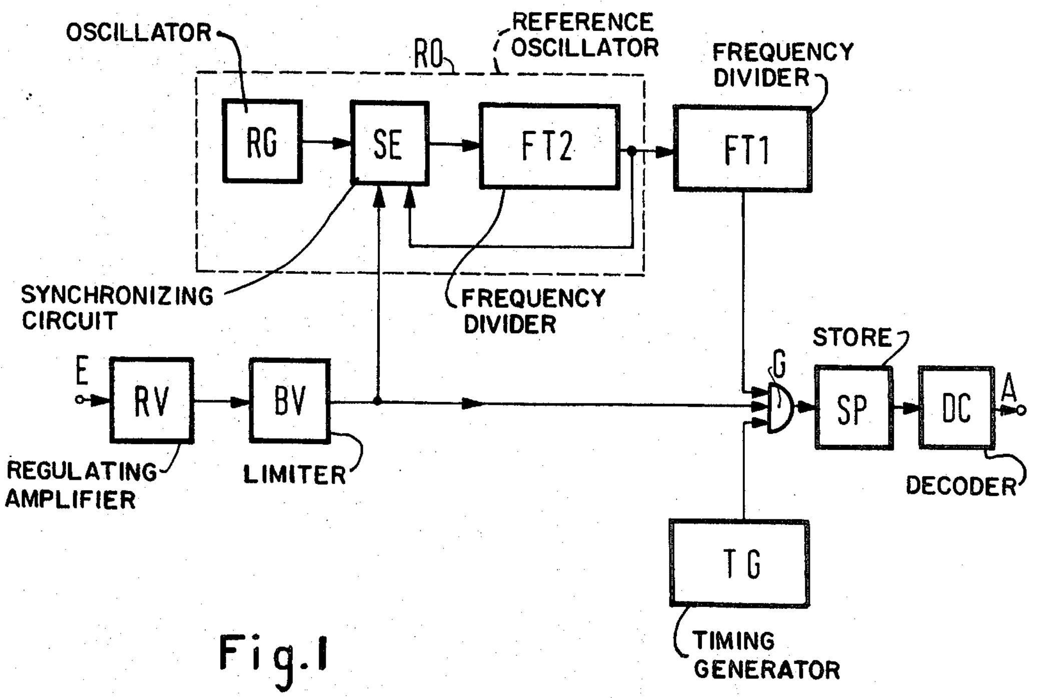
FIG. 1 is a block-schematic diagram of a demodulator circuit constructed according to the principles of the invention.

DETAILED DESCRIPTION OF THE DRAWING:

A preferred embodiment of circuitry constructed to operate according to the principles of the invention is described hereinbelow. This embodiment is illustrated by a block diagram. This form of description is used because the contents of each of the blocks are known to those skilled in the art. Accordingly, the contents of the blocks are described only in sufficient detail as necessary to permit one skilled in the art to construct, select or adjust the appropriate circuitry in order to practice the invention.

Figure 2:
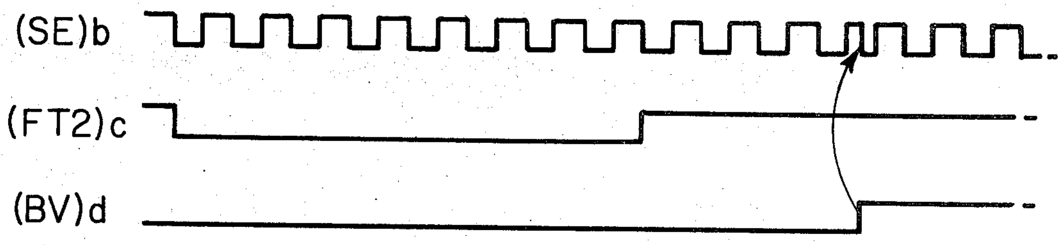
FIG. 2 is a time-waveform diagram illustrating the pertinent signal relationships for the operation of synchronizing circuit SE.
Figure 3:
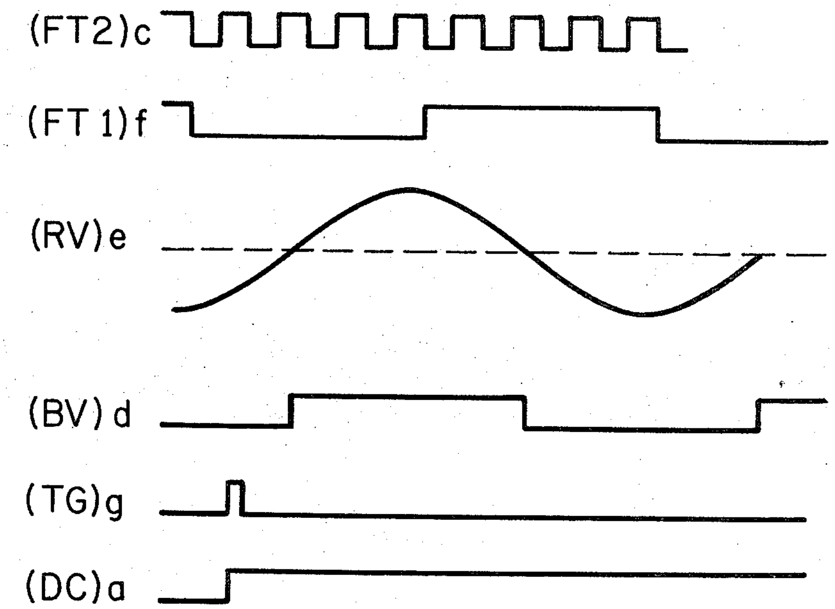
FIG. 3 is a time-waveform diagram illustrating the various signal relationships occurring at the identified points in the FIG. 1 embodiment.

In the discussion of the FIG. 1 embodiment given below reference should be had, as well, to FIGS. 2 and 3 which illustrate waveforms occurring at important points in the circuit. In FIGS. 2 and 3 the small letters identifying the various waveforms also identify those points in the FIG. 1 circuit in which those waveforms occur. In FIG. 3 it was necessary to alter the scale for the waveforms cd because the frequency difference between the input signal and the rectangular signal formed by the oscillator and the stages of the voltage divider is so great that it would not be possible to present a meaningful illustration. Hence, lines cd are presented in FIG. 3 on a reduced scale.

The carrier frequency modulated with phase shifts is received at an input E and brought to a constant mean level in a regulating amplifier RV. The modulated carrier frequency, still in sinusoidal form, is transformed in a succeeding limiter BV into a rectangular potential. Since the waveform is now rectangular, the phase modulation information, at the output of the limiter, is contained in the crossovers of the carrier frequency signal. The reference oscillator RG generates a signal having a frequency which has a value n times the value of the carrier frequency for *n*-valued phase difference modulation. To form the binary phase values the reference frequency is divided into the carrier frequency using binary divider stages. The phase values possible in the transmission are derived in binary coded form from the states of the individual divider stages. The phases of the reference frequency and the limiter signal output are coupled to a gate G.

The gate G, which is an AND gate, is controlled by timing generator TG which opens the gate in the middle of a modulation segment for a specific duration. The timing generator TG opens the gate only for a specific duration which is at least as long as the duration of the period of the rectangular potential emitted by the limiter. The crossover of the rectangular potential falling in this interval causes the reference phase from a frequency divider FT1 coinciding with the phase of the rectangular oscillation to be fed into the store SP in binary form. With the next scanning process the phase position of the succeeding modulation segment is fed into the store. The store relays the difference between the two phase values to a decoder DC, which emits the step combination of the associated data in accordance with the coding at output A.

The reference oscillator includes a generator RG, a synchronizing circuit SE and a frequency divider FT2. The generator RG generates a frequency which is greater than the reference frequency by the divider factor of the succeeding frequency divider FT2, which reference frequency is *n* times the value of the carrier frequency. A synchronizing circuit SE is inserted between the generator and the frequency divider. A pulse is directed to the synchronizing circuit at the moment of a crossover of the carrier oscillation, which determines the scanning moment, and this pulse is compared in the synchronizing circuit with the corresponding phase of the reference frequency at the output of the frequency divider. In case of a time deviation between the pulse triggered by the carrier oscillation crossover and corresponding portion of the reference frequency waveform it is determined in the synchronizing circuit whether a shortening or a lengthening of the phase is necessary to eliminate the phase error. The correction proceeds in a manner such that the phase position of the reference frequency, and therewith the n time regions at the output of the requency divider FT1 are altered. Thus, the new phase position corresponds to the mean values of the received n phase valves.

Synchronizing circuits which are suited for the above use are well known and may be constructed in the form of conventional logic switching circuits. Their basic method of operation comprises determining a deviation of the carrier phase from the target position by known comparison techniques, and then in case a time shortening is required one or more pulses are blocked from the frequency divider FT2. In case of a lengthening of the phase value is required one or move pulses are additionally coupled to the frequency divider.

It is also possible to temporarily reduce or increase the dividing factor of the frequency divider FT2 through temporarily releasing a restoring mechanism line. Also, the reconnection of the controlling signal at an inversion stage of the frequency divider causes a shift of the phase of the reference frequency.

The one method of phase synchronization comprises changing the phase taking place to a value proportional to the mean value of the time deviation.

Another method of phase synchronization comprises shifting the reference frequency by a small constant phase value, depending on the size of the time deviation.

In accordance with a further known method a correction of the phase of the reference frequency occurs only when, during an established number of modulation segments, a unilateral shift of the carrier phase with respect to the reference phase is determined. In an integrated circuit, using for example a capacitor or a forward-backward counter, the individual deviations are stored and a correction is effected in the established interval.

The size of the correction steps must always be small compared to a period of the reference frequency and must also allow for the final long term stability of the transmission path.

The preferred form described hereinabove is intended only to be exemplary of the principles of the invention. It is contemplated that a number of modifications and changes will occur to those skilled in the art, but these will be within the scope of the invention, as defined by the appended claims.

I claim:

1. Apparatus for demodulating phase difference modulated carrier signals wherein the carrier is modulated by specific, different valued phase shifts, said phase shift values corresponding to the various levels of a data signal, said phase shifts succeeding one another in a predetermined modulation interval, comprising:

reference oscillator means for generating a rectangular oscillation signal having a frequency of a value equal to *n* times the carrier frequency, where *n* equals the number of phase values with which said carrier signal is modulated, frequency divider means for reducing said reference oscillator output frequency to said carrier frequency, means for receiving said modulated carrier, limiter means for changing said modulated carrier waveform to a rectangular waveform, gate means, the outputs of said limiter means and said frequency divider means being connected to inputs of said means, timing generator means connected to said gate means for opening said gate means for a predetermined interval to allow a portion of said carrier waveform pass through said gate, and synchronizing circuit means having said portion of said limited carrier waveform and said reference oscillator output applied thereto for comparing the latter two signals, and including means responsive to the result of said comparison for correcting said reference oscillator output signal by a phase value of an amount corresponding to the time deviation between said two compared signals.

2. The apparatus defined in claim 1 wherein said reference oscillator means comprises a series connection of a frequency generator, said synchronizing circuit means and a second frequency divider means which emits n times the carrier frequency at the output thereof, the output of said second frequency divider means being connected, as the reference oscillator output, to said synchronizing circuit means;

and wherein said synchronizing circuit means includes means for one of blocking a predetermined portion of said reference generator output from said second divider means and adding pulses to the reference generator signal applied to said second divider means depending on the result of said comparison of said carrier waveform and the divided reference generator outputs.

3. In a data transmission system wherein binary coded data are transmitted by predetermined different valued phase shifts corresponding, respectively, to combinations of binary levels which modulate a carrier signal and wherein the different valued phase shifts follow each other within a fixed time interval thereby determing a modulating interval, a method for demodulating the phase difference modulated carrier signals for deriving the transmitted binary coded data, comprising the steps of:

receiving said phase difference modulated carrier signal, generating a reference frequency signal having all the phase values included in said received signal, deriving a signal from said received signal in which the phase values are contained in crossovers of the derived signal, producing a pulse when a crossover of said derived signal occurs, comparing the phase of said produced pulse with the corresponding phase of said reference frequency, correcting the phase of said reference frequency in accordance with the result of said comparing step to remove any phase error between said derived signal and said reference frequency, forming binary phase values from said reference signal, storing a said binary phase value when a crossover of said derived signal coincides with a said binary phase value, comparing said stored binary phase value with the phase position of the next succeeding crossover of said derived signal and producing a difference signal corresponding in valve to the difference between the compared phase values and decoding said difference signal to obtain said binary coded data.

4. The method defined in claim 3 wherein said correcting step further comprises adding pulses to, or subtracting pulses from, said reference frequency, as necessary, in accordance with the result of said comparing step wherein the phase of said produced pulse is compared with the phase of said reference frequency.

5. The method defined in claim 3 wherein said correcting step further comprises shifting said reference frequency by a small constant phase value until any of said phase error between said derived signal and said reference fequency, as determined from said comparing step, is removed.

* * * * *